United States Patent
Takahashi

[11] 4,009,944
[45] Mar. 1, 1977

[54] MINIATURE AND LARGE APERTURE RETROFOCUS WIDE-ANGLE LENS

[75] Inventor: Yasuo Takahashi, Tokyo, Japan
[73] Assignee: Asahi Kogaku Kogyo Kabushiki Kaisha, Tokyo, Japan
[22] Filed: Aug. 21, 1975
[21] Appl. No.: 606,676
[30] Foreign Application Priority Data
Aug. 23, 1974   Japan .................. 49-96911
[52] U.S. Cl. .................. 350/214
[51] Int. Cl.² .................. G02B 13/04
[58] Field of Search .................. 350/214

[56] References Cited
UNITED STATES PATENTS
3,938,883   2/1976   Takahashi .................. 350/214

Primary Examiner—John K. Corbin
Assistant Examiner—Conrad Clark
Attorney, Agent, or Firm—Sughrue, Rothwell, Mion, Zinn & Macpeak

[57] ABSTRACT

A miniature and large aperture retrofocus wide-angle lens whose aberration is satisfactorily corrected composed of eight lens elements consisting of ten lenses and grouped in two groups of five lenses each wherein the following conditions (1) to (6) are satisfied:

(1) $n_2, n_3 > 1.7 \quad \nu_1 < 50$ (2) $\dfrac{F}{1.33} < |F_{1\cdot2\cdot3\cdot4\cdot5}| < \dfrac{F}{0.95} \cdot F_{1\cdot2\cdot3\cdot4\cdot5} < 0$ (3) $0.1 < n_6 - n_7 < 0.3$ (4) $0.48F < |r_{11}| < 0.63F, \quad r_{11} < 0$ (5) $\dfrac{\nu_9 + \nu_{10}}{2} > 58$ (6) $\dfrac{F}{0.6} < F_{1\cdot2\cdot3\cdot4\cdot5\cdot6\cdot7} < \dfrac{F}{0.45}$

2 Claims, 10 Drawing Figures

SPHERICAL ABERRATION AND SINE CONDITION

CHROMATIC ABERRATION

DISTORTION

ASTIGMATISM

MINIATURE AND LARGE APERTURE RETROFOCUS WIDE-ANGLE LENS

SUMMARY OF THE INVENTION

This invention relates to a retrofocus wide-angle lens, the lens being miniaturized so that the back-focus is more than 1.48–1.63 times of the resultant focal length, the aperture ratio $F_{NO}$ is about 1 : 2, and a covering angle is more than about 80°. This accomplished by providing a lens system consisting of ten lenses forming eight lens components and grouped in two groups of five lenses each wherein the following conditions are satisfied:

(1) $n_2, n_3 > 1.7 \quad \nu_1 < 50$ (2) $\frac{F}{1.33} < |F_{1 \cdot 2 \cdot 3 \cdot 4 \cdot 5}| < \frac{F}{0.95}, F_{1 \cdot 2 \cdot 3 \cdot 4 \cdot 5} < 0$ (3) $0.1 < n_6 - n_7 < 0.3$ (4) $0.48F < |r_{11}| < 0.63F, r_{11} < 0$ (5) $\frac{\nu_9 + \nu_{10}}{2} > 58$ (6) $\frac{F}{0.6} < F_{1 \cdot 2 \cdot 3 \cdot 4 \cdot 5 \cdot 6 \cdot 7} < \frac{F}{0.45}$

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENTS

Figure 1:
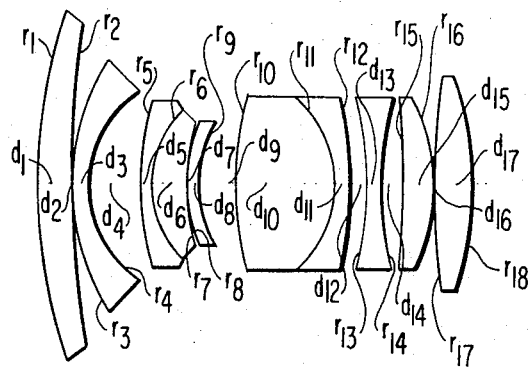
FIG. 1 is a longitudinal view showing the lens system in accordance with the first embodiment of the invention.

A description of the construction of the lens system will be given first. The first lens of the system is a positive lens whose surface of greater curvature is directed toward the object, the second lens is a negative meniscus lens whose surface of greater curvature is directed toward the image, the third and fourth lenses are a negative meniscus lens and a positive lens, respectively, cemented together with each other, the surfaces of greater curvature of said third and fourth lenses being cemented together, the fifth lens is also a negative meniscus lens whose surface of greater curvature is directed toward the image. The lenses from the first to the fifth are combined to form a negative lens, thus forming the first half group. The sixth and seventh lenses are a positive thick lens and a negative meniscus lens, respectively, whose surfaces of greater curvature are cemented together, the eighth lens is the negative double-concave lens, the ninth lens is the positive meniscus lens whose surface of greater curvature is directed toward the image, and the tenth lens is the positive lens. The lenses from the sixth to the tenth form the second half group, which are combined to form a positive lens. This second half group is disposed opposite the first half group to form a retrofocus lens.

The retrofocus lens according to the invention is characterized by the following six conditions as noted below, which will be described in greater detail later.

$N_2, n_3 > 1.7 \quad \nu_1 < 50$ (1)

$\frac{F}{1.33} < |F_{1 \cdot 2 \cdot 3 \cdot 4 \cdot 5}| < \frac{F}{0.95}, F_{1 \cdot 2 \cdot 3 \cdot 4 \cdot 5} < 0$ (2)

$0.1 < n_6 - n_7 < 0.3$ (3)

$0.48F < |r_{11}| < 0.63F, r_{11} < 0$ (4)

$\frac{\nu_9 + \nu_{10}}{2} > 58$ (5)

$\frac{F}{0.6} < F_{1 \cdot 2 \cdot 3 \cdot 4 \cdot 5 \cdot 6 \cdot 7} < \frac{F}{0.45}$ (6)

where
$F$: the resultant focal length
$F_i$: the resultant focal length up to the $i$ lens
$r_j$: the radius of curvature of the $j$ lens
$d_k$: the thickness of the $k$ lens or the spacing between lenses
$n_i$: the refractive index of the $d$-line in the $i$ lens
$\nu_i$: the Abbe number of the $i$ lens
$f_B$: the back-focal length
The various conditions as described above will be explained in detail in the following.

CONDITION (1)

This condition is provided to eliminate a deficiency involved in miniaturization. The negative lens having the refractive index in excess of $n_2, n_3 > 1.7$ is required to be used in order to avoid the fact that the radius of curvature of the surface directed toward the image as in the negative meniscus lens becomes excessively small as the negative lens becomes thicker in the process of miniaturization. This condition also prevents the frame aberration or coma in the first half group from being worsened. This becomes necessary in relation to the condition (2). It is natural that the foregoing fact is a result of the small value of $F_{NO}$. The condition of $\nu_1 < 50$ is provided for selection of optical glass to serve as the negative lens having the refractive index $n_2, n_3 > 1.7$. At present, optical glass relatively small in Abbe number value must be used, and hence, a lens small in the $\nu$ value must be used for the fourth lens in order to maintain the balance of chromatic aberration in the first half group. This arrangement is imperative because the presence of difference in the refractive index between the third lens and the fourth lens represents the effect as the negative lens. Also it is not desirable to compensate the refractive power by the curvature by reason of such that the thickness $d_6$ becomes greater, resulting in a great size as a whole. Therefore, the relationship of $\nu_1 < 50$ must be maintained, and the focal length $F_1$ may be determined in terms of balance with respect to various aberrations including a strain aberration. Thus, the value $\nu_1$ may also be suitably selected.

CONDITION (2)

This condition is necessary for the purpose of miniaturization and at the same time represents the combination imperative for those which have an aperture ratio $F_{NO}$ of about 1 : 2 and approximately 80° field of view angle. If the value of $|F_{1.2.3.4.5}|$ is negative and is shorter than (F/1.33), it is necessary to increase the power of the negative, lens, and as a result, the radius of curvature decreases even if you should make a good use of the condition (1), resulting in a state wherein the frame aberration or coma tends to be worsened further under the above-mentioned aperture ratio $F_{NO}$ and field of view angle thereby causing difficulty of correction in the second half group. Thus, this case is not suitable. Conversely, if the value of $|F_{1.2.3.4.5}|$ is longer than (F/0.95), miniaturization is difficult to achive and in addition, you must rely on the second half group to obtain the desired length of the backfocus, resulting in a tendency to extend the overall length and to extremely decrease quantities of circumferential light thus losing an essential object. Thus, this case also is not desirable.

CONDITIONS (3) and (4)

Condition (3) is provided to correct the spherical aberration in a higher order region in relation to the condition (4). The radius $r_{10}$ makes a great contribution to the absolute quantity. It is noted that the refractive power in the $r_{11}$th surface acts somewhat rapidly toward the short of correction. If the refractive index $n_6-n_7$ in condition (3) is smaller than 0.1, it will be difficult to attain the object of the invention even if $r_{11}$ is shorter than 0.48F set in the condition (4). To obtain the value less than 0.48F, the lens must be made thicker to influence the overall length, the diameter of the front lens and the like causing them to be longer and greater, respectively, resulting in a failure to attain the object of the invention. Moreover, if the radius $r_{11}$, which is longer than 0.63F, is used in condition (4), correction in the presence of a marginal ray becomes over correction resulting in a failure to obtain the object of the invention. Conversely, if the $n_6-n_7$ is greater than 0.3, correction results to bring about an excessively great under correction of the marginal ray, which is unfavorable. Especially when the chromatic aberration is corrected at a time, the spherical aberration greatly displaces in color by the marginal ray. In the preferred embodiments herein, the sixth and seventh lenses are cemented together by use of optical glass of nearly equal dispersion so as to avoid the disadvantages noted above.

CONDITION (5)

This condition is provided to offer an important effect in maintaining chromatic aberration of magnification. It is natural in the first half group that treatment is made up to the sixth lens in a condition with over correction remained wherein the negative lenses are greatly acted, remaining an under-correction to some extent in the sixth lens, appearing over correction in the eighth negative lens, finally, generally performing correction of suitable chromatic aberration in the ninth and tenth lenses. However, for the provision of excessive correction in the eighth lens, the optical glass has a limitation for practical use and as a consequence, it is desirable to impart greater value in Abbe numbers for the ninth and tenth lenses. In this invention, the average value greater than 58 is required according to the combination of the degrees of the first half group and the combination of optical glass. In case that optical glass not greater in value than 58 is used, the power of the negative eighth lens must be made greater to maintain the over-correction. But, this results in a decrease of the Petzval sum to unbalance the overall aberration.

CONDITION (6)

This condition is a condition indirectly related to the condition (5), the condition (6) determining power of lenses from the first to seventh lenses and relating to power of lenses from the eighth to the tenth lenses, particularly exerting an influence upon determination of power of the eighth lens, and forming an imperative part in correction of chromatic aberration and in determination of a suitable Petzval sum in the second half group. In order to obtain the desired backfocus when the focal length $F_{1.2.3.4.5.6.7}$ is shorter than (F/0.6, the negative power of the eighth lens must be further increases or the thickness $d_{14}$ must be made greater. The former tends to decrease the Petzval sum, while the latter results in an increase of negative distortion. Thus, this is inadequate. Further, if the focal length is longer than (F/0.45, it will be advantageous for the backfocus, whereas the power of the eighth lens is small and a deficiency in correction of chromatic aberration results. Under the circumstances, it currently involves inadequacies such that unpractical optical glass must be used or, a step must be taken to cement either the eighth, the ninth or the tenth lens.

Two specific examples of the present invention will be described herein below:

The first example is shown in FIG. 1 and consists of ten lenses forming eight lens elements and grouped in two groups of five lenses each. The first lens $L_1$ is a positive lens whose surface of greater curvature is directed toward the object. The second and third lenses are both negative meniscus lenses whose surfaces of greater curvature are directed toward the image. The fourth lens is a positive lens having its surface of greater curvature cemented to the surface of greater curvature of the third lens to form a doublet. The fifth lens is a negative meniscus lens having its surface of greater curvature directed toward the image. These first five lenses comprise the first group and form a negative lens. The sixth lens is a thick double-convex lens and is cemented to the seventh lens to form another doublet. The seventh lens is a negative meniscus lens, and surface of greater curvature of the sixth and seventh lenses are cemented. The eighth lens is a negative double-concave lens. The ninth lens is a positive meniscus lens whose surface of greater curvature is directed toward the image. Finally, the tenth lens is a positive lens whose surface of greater curvature is directed toward the image. The radii of curvature $r_1$ to $r_{18}$ and the lens thicknesses and lens separations $d_1$ to $d_{17}$, along with the refractive indices $n_1$ to $n_{10}$ and Abbe numbers $_1$ to $_{10}$ for lenses $L_1$ to $L_{10}$ which comprise the first embodiment shown in FIG. 1 are given in Table I as follows:

TABLE I $$F = 100$$

$$F_{1,2,3,4,5} = -\frac{F}{1.294} = -77.28$$

$$F_{1,2,3,4,5,6,7} = \frac{F}{0.538} = 185.87$$

$$\Sigma_p = 0.126$$

$$f_B = 1.618F$$

| Lens L | Radius of Curvature r | | Lens Thickness or Spacing d | | Refractive Index n | | Abbe No. $\nu$ | |
|---|---|---|---|---|---|---|---|---|
| $L_1$ | $r_1$ = | 269.94 | | | | | | |
| | | | $d_1$ = | 16.33 | $n_1$ = | 1.80610 | $\nu_1$ = | 40.9 |
| | $r_2$ = | 787.86 | | | | | | |
| | | | $d_2$ = | 0.41 | | | | |
| $L_2$ | $r_3$ = | 103.54 | | | | | | |
| | | | $d_3$ = | 6.12 | $n_2$ = | 1.73400 | $\nu_2$ = | 51.5 |
| | $r_4$ = | 46.49 | | | | | | |
| | | | $d_4$ = | 27.11 | | | | |
| $L_3$ | $r_5$ = | 147.79 | | | | | | |
| | | | $d_5$ = | 4.98 | $n_3$ = | 1.78590 | $\nu_3$ = | 44.1 |
| $L_4$ | $r_6$ = | 48.09 | | | | | | |
| | | | $d_6$ = | 15.68 | $n_4$ = | 1.71736 | $\nu_4$ = | 29.5 |
| | $r_7$ = | 123.70 | | | | | | |
| | | | $d_7$ = | 0.98 | | | | |
| $L_5$ | $r_8$ = | 80.02 | | | | | | |
| | | | $d_8$ = | 4.82 | $n_5$ = | 1.78590 | $\nu_5$ = | 44.1 |
| | $r_9$ = | 55.52 | | | | | | |
| | | | $d_9$ = | 17.72 | | | | |
| $L_6$ | $r_{10}$ = | 133.60 | | | | | | |
| | | | $d_{10}$ = | 49.48 | $n_6$ = | 1.75700 | $\nu_6$ = | 47.9 |
| | $r_{11}$ = | −53.07 | | | | | | |
| $L_7$ | | | $d_{11}$ = | 6.12 | $n_7$ = | 1.54072 | $\nu_7$ = | 47.2 |
| | $r_{12}$ = | −176.35 | | | | | | |
| | | | $d_{12}$ = | 7.47 | | | | |
| $L_8$ | $r_{13}$ = | −144.49 | | | | | | |
| | | | $d_{13}$ = | 7.35 | $n_8$ = | 1.80518 | $\nu_8$ = | 25.4 |
| | $r_{14}$ = | 178.09 | | | | | | |
| | | | $d_{14}$ = | 8.61 | | | | |
| $L_9$ | $r_{15}$ = | −457.68 | | | | | | |
| | | | $d_{15}$ = | 14.92 | $n_9$ = | 1.61800 | $\nu_9$ = | 63.4 |
| | $r_{16}$ = | −82.64 | | | | | | |
| | | | $d_{16}$ = | 0.73 | | | | |
| $L_{10}$ | $r_{17}$ = | 571.54 | | | | | | |
| | | | $d_{17}$ = | 19.03 | $n_{10}$ = | 1.56873 | $\nu_{10}$ = | 63.1 |
| | $r_{18}$ = | −123.54 | | | | | | |

Figure 2A:
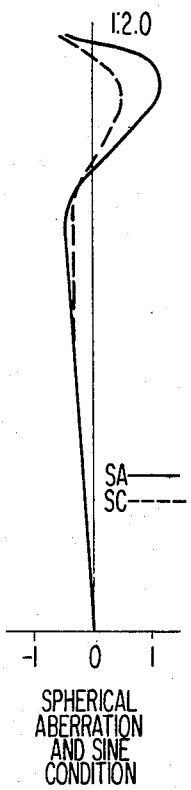
FIG. 2a to 2d show aberration curved obtained by the lens system in accordance with the first embodiment of the invention.
Figure 2B:
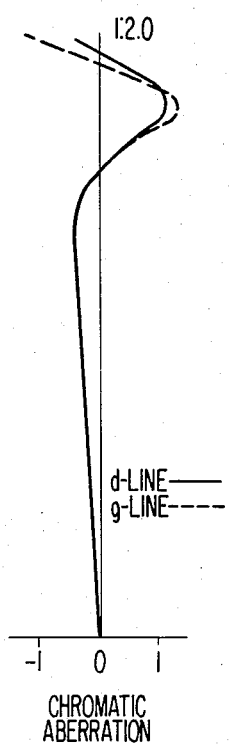
Figure 2C:
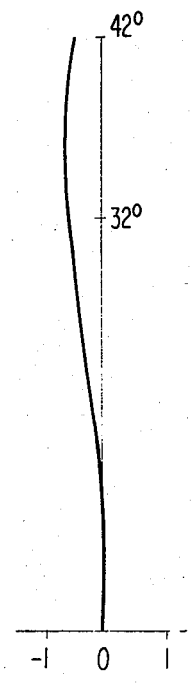
Figure 2D:
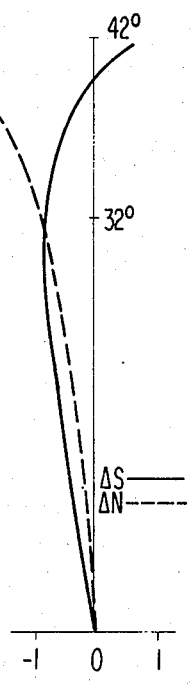

FIG. 2a shows the spherical aberration and sine condition, FIG. 2b shows the spherical aberration and chromatic aberration, FIG. 2c shows the distortion, and FIG. 2d shows the astigmatism of the wide angle lens shown in FIG. 1 and defined in Table I.

Figure 3:
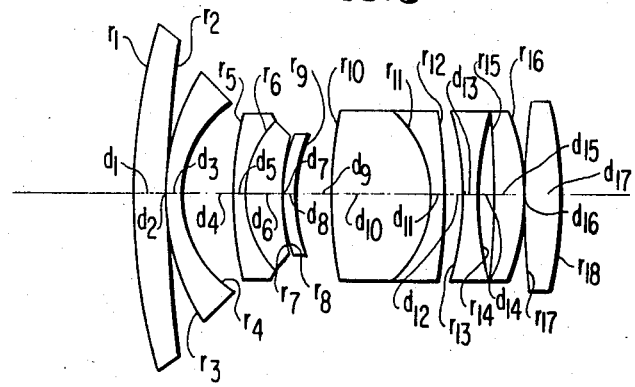
FIG. 3 is a longitudinal view showing the lens system in accordance with the second embodiment of the invention.

The second example is shown in FIG. 3 and is, again, composed of eight lens elements consisting of ten lenses in two groups of five each. The lens system consists of a first positive lens, $L_1$, a second negative meniscus lens $L_2$, a third negative meniscus lens $L_3$ whose surface of greater curvature is cemented with a fourth positive lens $L_4$, a fifth negative meniscus lens $L_5$, a sixth positive lens $L_6$, cemented with a seventh lens $L_7$, an eighth negative double-concave lens $L_8$, a ninth positive meniscus lens $L_9$, and a tenth positive lens $L_{10}$. The radii of currvature $r_1$ to $r_{18}$ and the lens thicknesses and lens separations $d_1$ to $d_{17}$, along with the refractive indices $n_1$ to $n_{10}$ and Abbe numbers $\nu_1$ to $\nu_{10}$ for lenses $L_1$ to $L_{10}$ which comprises the first embodiment shown in FIG. 3 are given in Table II as follows:

TABLE II $$F = 100$$

$$F_{1\cdot2\cdot3\cdot4\cdot5} = -\frac{F}{1.258} = -79.49$$

$$F_{1\cdot2\cdot3\cdot4\cdot5\cdot6\cdot7} = \frac{F}{0.543} = 184.16$$

$$\Sigma_p = 0.122$$

$$f_B = 1.598F$$

| Lens L | Radius of Curvature r | Lens Thickness or Spacing d | Refractive Index n | Abbe No. ν |
|---|---|---|---|---|
| $L_1$ | $r_1 = 245.33$ | $d_1 = 16.35$ | $n_1 = 1.80400$ | $\nu_1 = 46.6$ |
|  | $r_2 = 605.14$ | $d_2 = 0.41$ |  |  |
| $L_2$ | $r_3 = 104.88$ | $d_3 = 6.13$ | $n_2 = 1.71300$ | $\nu_2 = 53.9$ |
|  | $r_4 = 46.64$ | $d_4 = 27.15$ |  |  |
| $L_3$ | $r_5 = 152.10$ | $d_5 = 4.99$ | $n_3 = 1.78650$ | $\nu_3 = 50.2$ |
| $L_4$ | $r_6 = 58.76$ | $d_6 = 15.70$ | $n_4 = 1.71736$ | $\nu_4 = 29.5$ |
|  | $r_7 = 123.89$ | $d_7 = 0.98$ |  |  |
| $L_5$ | $r_8 = 73.60$ | $d_8 = 4.82$ | $n_5 = 1.78590$ | $\nu_5 = 44.1$ |
|  | $r_9 = 52.07$ | $d_9 = 17.75$ |  |  |
| $L_6$ | $r_{10} = 142.49$ | $d_{10} = 49.56$ | $n_6 = 1.75700$ | $\nu_6 = 47.9$ |
| $L_7$ | $r_{11} = -50.46$ | $d_{11} = 6.13$ | $n_7 = 1.54869$ | $\nu_7 = 45.6$ |
|  | $r_{12} = -168.46$ | $d_{12} = 7.48$ |  |  |
| $L_8$ | $r_{13} = -142.49$ | $d_{13} = 7.36$ | $n_8 = 1.80518$ | $\nu_8 = 25.4$ |
|  | $r_{14} = 188.98$ | $d_{14} = 8.63$ |  |  |
| $L_9$ | $r_{15} = -458.37$ | $d_{15} = 14.84$ | $n_9 = 1.61800$ | $\nu_9 = 63.4$ |
|  | $r_{16} = -82.77$ | $d_{16} = 0.74$ |  |  |
| $L_{10}$ | $r_{17} = 690.60$ | $d_{17} = 19.05$ | $n_{10} = 1.56873$ | $\nu_{10} = 63.1$ |
|  | $r_{18} = -121.91$ |  |  |  |

Figure 4A:
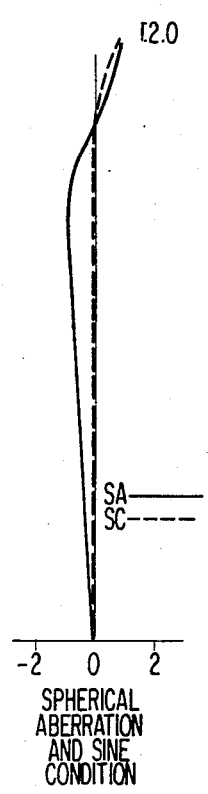
FIGS. 4a to 4d show aberration curves obtained by the lens system in accordance with the second embodiment of the invention.
Figure 4B:
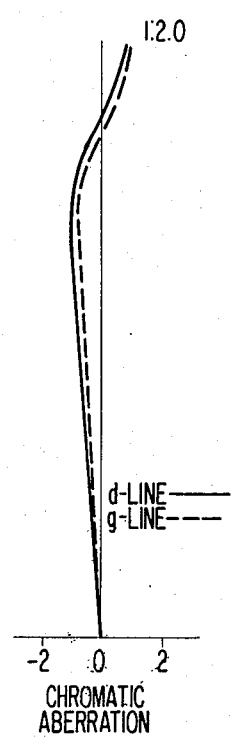
Figure 4C:
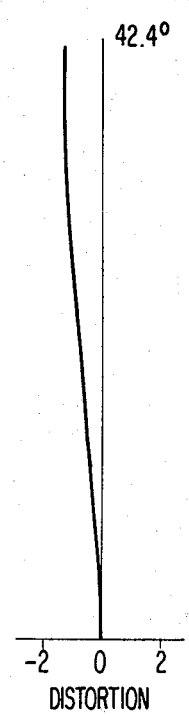
Figure 4D:
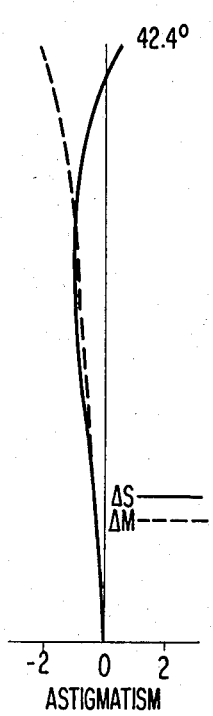

FIG. 4a shows the spherical aberration and sine condition, FIG. 4b shows the spherical aberration and chromatic aberration, FIG. 4c shows the distortion, and FIG. 4d shows the astigmatism of the wide angle lens shown in FIG. 3 and difined in Table II.

It will be apparent that the embodiments shown are only exemplary and that various modifications can be made in construction and arrangement within the scope of the invention as defined in the appended claims.

I claim:

1. A miniature and large aperture retrofocus wide-angle lens comprising ten lenses forming eight components wherein the radii of curvature $r_1$ to $r_{18}$, the lens thicknesses and the lens separations $d_1$ to $d_{17}$, the refractive indices $n_1$ to $n_{10}$, and Abbe numbers $\nu_1$ to $\nu_{10}$ of said first to tenth lenses $L_1$ to $L_{10}$, respectively, satisfy the following conditions:

$$F = 100$$

$$F_{1\cdot2\cdot3\cdot4\cdot5} = -\frac{F}{1.294} = -77.28$$

$$F_{1\cdot2\cdot3\cdot4\cdot5\cdot6\cdot7} = \frac{F}{0.538} = 185.87$$

$$\Sigma_P = 0.126$$

$$f_B = 1.618F$$

where F is the composite focal length, $\Sigma_p$ is the Petzval sum and $f_B$ is the back focal length

| Lens L | Radius of Curvature r | Lens Thickness or Spacing d | Refractive Index n | Abbe No. ν |
|---|---|---|---|---|
| $L_1$ | $r_1 = 69.94$ | $d_1 = 16.33$ | $n_1 = 1.80610$ | $\nu_1 = 40.9$ |
|  | $r_2 = 787.86$ | $d_2 = 0.41$ |  |  |
| $L_2$ | $r_3 = 103.54$ | $d_3 = 6.12$ | $n_2 = 1.73400$ | $\nu_2 = 51.5$ |
|  | $r_4 = 46.49$ | $d_4 = 27.11$ |  |  |
| $L_3$ | $r_5 = 147.79$ | $d_5 = 4.98$ | $n_3 = 1.78590$ | $\nu_3 = 44.1$ |

-continued

| Lens L | Radius of Curvature r | Lens Thickness or Spacing d | Refractive Index n | Abbe No. $\nu$ |
|---|---|---|---|---|
| $L_4$ | $r_6 = 48.09$ | $d_6 = 15.68$ | $n_4 = 1.71736$ | $\nu_4 = 29.5$ |
|  | $r_7 = 123.70$ | $d_7 = 0.98$ |  |  |
| $L_5$ | $r_8 = 80.02$ | $d_8 = 4.82$ | $n_5 = 1.78590$ | $\nu_5 = 44.1$ |
|  | $r_9 = 55.52$ | $d_9 = 17.72$ |  |  |
| $L_6$ | $r_{10} = 133.60$ | $d_{10} = 49.48$ | $n_6 = 1.75700$ | $\nu_6 = 47.9$ |
|  | $r_{11} = -53.07$ | $d_{11} = 6.12$ | $n_7 = 1.54072$ | $\nu_7 = 47.2$ |
| $L_7$ | $r_{12} = -176.35$ | $d_{12} = 7.47$ |  |  |
| $L_8$ | $r_{13} = -144.49$ | $d_{13} = 7.35$ | $n_8 = 1.80518$ | $\nu_8 = 25.4$ |
|  | $r_{14} = 178.09$ | $d_{14} = 8.61$ |  |  |
| $L_9$ | $r_{15} = -457.68$ | $d_{15} = 14.92$ | $n_9 = 1.61800$ | $\nu_9 = 63.4$ |
|  | $r_{16} = -82.64$ | $d_{16} = 0.73$ |  |  |
|  | $r_{17} = 571.54$ |  |  |  |
| $L_{10}$ | $r_{18} = -123.54$ | $d_{17} = 19.03$ | $n_{10} = 1.56873$ | $\nu_{10} = 63.1$ |

-continued

2. A miniature and large aperature retrofocus wide-angle lens comprising ten lenses forming eight compenents wherein the radii of curvature $r_1$ to $r_{18}$, the lens thickness and the lens separations $d_1$ to $d_{17}$, the refractive indices $n_1$ to $n_{10}$ and Abbe numbers $\nu_1$ to $\nu_{10}$ of said first to tenth lenses $L_1$ to $L_{10}$, respectively, satisfy the following conditions:

$F = 100$ $$F_{1.2.3.4.5} = -\frac{F}{1.258} = -79.49$$

$$F_{1.2.3.4.5.6.7} = \frac{F}{0.543} = 184.16$$

$\Sigma_p = 0.122$ $f_B = 1.598F$ where $F$ is the composite focal length, $\Sigma_p$ is the Petzval sum and $f_B$ is the back focal length

| Lens L | Radius of Curvature r | Lens Thickness or Spacing d | Refractive Index n | Abbe No. $\nu$ |
|---|---|---|---|---|
| $L_1$ | $r_1 = 245.33$ | $d_1 = 16.35$   $n_1 = 1.80400$ | | $\nu_1 = 46.6$ |
|  | $r_2 = 605.14$ | $d_2 = 0.41$ |  |  |
| $L_2$ | $r_3 = 104.88$ | $d_3 = 6.13$   $n_2 = 1.71300$ | | $\nu_2 = 53.9$ |
|  | $r_4 = 46.64$ | $d_4 = 27.15$ |  |  |
| $L_3$ | $r_5 = 152.10$ | $d_5 = 4.99$   $n_3 = 1.78650$ | | $\nu_3 = 50.2$ |
|  | $r_6 = 58.76$ |  |  |  |
| $L_4$ |  | $d_6 = 15.70$   $n_4 = 1.71736$ | | $\nu_4 = 29.5$ |
|  | $r_7 = 123.89$ | $d_7 = 0.98$ |  |  |
| $L_5$ | $r_8 = 73.60$ | $d_8 = 4.82$   $n_5 = 1.78590$ | | $\nu_5 = 44.1$ |
|  | $r_9 = 52.07$ | $d_9 = 17.75$ |  |  |
| $L_6$ | $r_{10} = 142.49$ | $d_{10} = 49.56$   $n_6 = 1.75700$ | | $\nu_6 = 47.9$ |
| $L_7$ | $r_{11} = -50.46$ | $d_{11} = 6.13$   $n_7 = 1.54869$ | | $\nu_7 = 45.6$ |
|  | $r_{12} = -168.46$ | $d_{12} = 7.48$ |  |  |
| $L_8$ | $r_{13} = -142.49$ | $d_{13} = 7.36$   $n_8 = 1.80518$ | | $\nu_8 = 25.4$ |
|  | $r_{14} = 188.98$ | $d_{14} = 8.63$ |  |  |
| $L_9$ | $r_{15} = -458.37$ | $d_{15} = 14.84$   $n_9 = 1.61800$ | | $\nu_9 = 63.4$ |
|  | $r_{16} = -82.77$ | $d_{16} = 0.74$ |  |  |
| $L_{10}$ | $r_{17} = 690.60$ | $d_{17} = 19.05$   $n_{10} = 1.56873$ | | $\nu_{10} = 63.1$ |
|  | $r_{18} = -121.91$ |  |  |  |

* * * * *